E. A. Palmer.
Plow Clevis.
N° 15,743.   Patented Sep. 16, 1856.
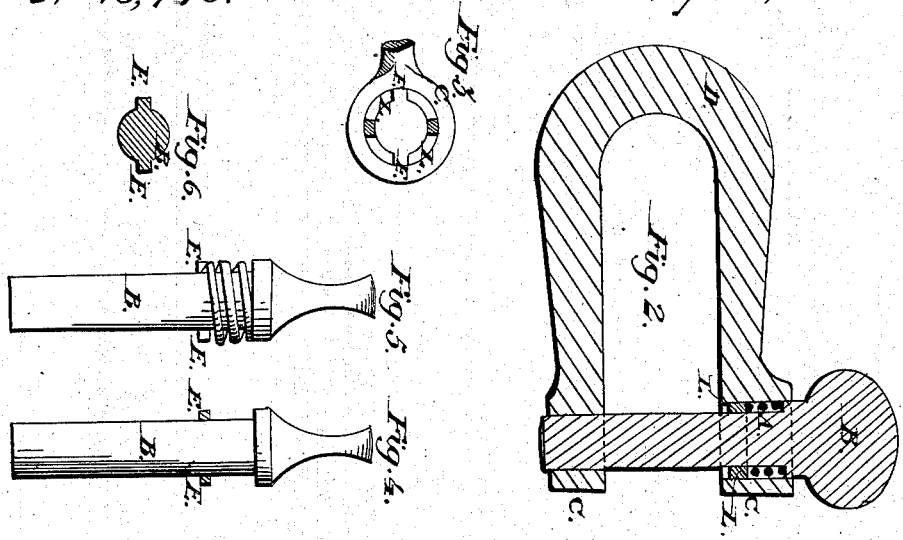
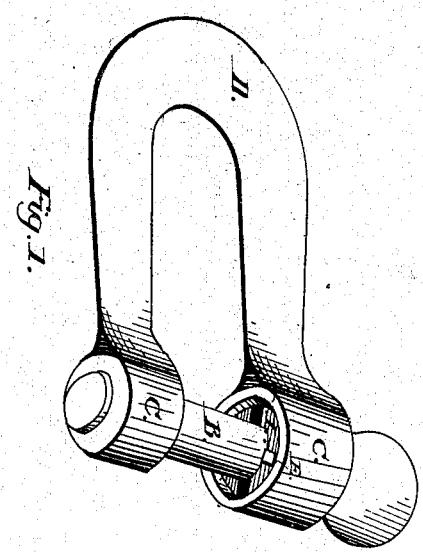

UNITED STATES PATENT OFFICE.

E. A. PALMER, OF CLAYVILLE, NEW YORK.

IMPROVED CLEVIS.

Specification forming part of Letters Patent No. 15,743, dated September 16, 1856.

*To all whom it may concern:*

Be it known that I, EDWIN A. PALMER, of Clayville, in the county of Oneida and State of New York, have invented a new and Improved Clevis; and I do hereby declare that the following is a full and exact description thereof, reference being had to the accompanying drawings, and to the letters of reference marked thereon, in which—

Figure 1 is a perspective view of a clevis. Fig. 2 is a vertical section. Fig. 3 is a view of the under side of the head C; Figs. 4 and 5, the clevis-pin, and Fig. 6 a section of the pin at E E.

The same letters refer to like parts.

D is a clevis, made of malleable or other iron, the upper head, C, being larger than the lower one, with a hole in it sufficient to receive the shoulder of the pin B and deep enough for the spring A. Under the spring is a projection, L, with a hole in it to fit the body of the pin, except openings through which the arms E E of the pin may pass, as seen in Fig. 3 at F F. In the under side of the projection are recesses I I, large enough to receive the arms E E of the pin and hold the pin in its place, there being room enough under the projection for the arms to turn around freely without coming below the surface of the head.

To operate or use the clevis, put the pin, with the arms down, through the openings in the projection and turn it one-fourth around, and the spring will press the pin and arms back into the recesses I I. The spring will keep the arms in their places and prevent the pin from turning, and thus obviate the friction.

This arrangement make, a cheap and useful clevis without a screw on the pin or a key-hole for a key to keep the pin in its place.

I do not claim any part of the common clevis; but—

What I do claim as my invention, and desire to secure by Letters Patent, is—

The pin provided with a spring and arms, E E, in combination with the projection in the head and openings through which the arms may pass, and the recesses I I, arranged substantially as described, and for the purposes set forth.

EDWIN A. PALMER.

Witnesses:
 JAMES CORBETT,
 DELANEY LEWIS.